United States Patent [19]
Hojoh

[11] Patent Number: 5,228,344
[45] Date of Patent: Jul. 20, 1993

[54] METHOD OF MEASURING PRESSURES USING A TUNING FORK CRYSTAL OSCILLATOR

[75] Inventor: Hisao Hojoh, Tokyo, Japan

[73] Assignee: Vacuum Products Kabushiki Kaisha, Tokyo, Japan

[21] Appl. No.: 743,227

[22] Filed: Aug. 9, 1991

[30] Foreign Application Priority Data

Aug. 10, 1990 [JP] Japan .................................. 2-212417

[51] Int. Cl.⁵ .............................................. G01L 11/00
[52] U.S. Cl. .......................................... 73/702; 73/708
[58] Field of Search ................ 73/702, 704, 708, 384; 310/338, 370

[56] References Cited

U.S. PATENT DOCUMENTS

| | | | |
|---|---|---|---|
| 4,995,263 | 2/1991 | Stocker | 73/702 |
| 4,995,264 | 2/1991 | Stocker et al. | 73/702 |
| 4,995,265 | 2/1991 | Stocker | 73/702 |

*Primary Examiner*—Donald O. Woodiel
*Attorney, Agent, or Firm*—Wenderoth, Lind & Ponack

[57] ABSTRACT

A pressure is measured by obtaining a difference between an actual resonance resistance of a tuning fork oscillator subjected to the pressure and a natural resonance resistance of the tuning fork oscillator, and then applying the difference to a predetermined relation to obtain a measurement of the pressure. Variations in the natural resonance resistance of the tuning fork oscillator due to temperature variations of the tuning fork oscillator are compensated for by measuring a resonance frequency of the tuning fork oscillator and then determining the natural resonance resistance of the tuning fork oscillator from the resonance frequency based on a predetermined relation between the resonance frequency and the natural resonance resistance of the tuning fork oscillator. The resonance frequency of the tuning fork oscillator is indicative of the temperature of the tuning fork oscillator.

5 Claims, 4 Drawing Sheets

METHOD OF MEASURING PRESSURES USING A TUNING FORK CRYSTAL OSCILLATOR

BACKGROUND OF THE INVENTION

1. Field of the Invention

The present invention relates to a method of measuring pressures using a tuning fork crystal oscillator.

2. Prior Art

There is a conventional method which allows for the use of a tuning fork crystal oscillator (which will be referred to simply as a "fork oscillator") to measure pressures (primarily pressures in vacuum), such as disclosed in Japanese utility model application, publication No. 64(1989)-38547. It is known that the fork oscillator has a resonance resistance which increases in proportion to pressures when a gaseous substance is in a molecule flow region, and increases in proportion to the square of half the pressures in a viscous flow region. The conventional method makes use of this property of the fork oscillator. It is also known that the fork oscillator provides a useful pressure measuring means since it is capable of measuring a wide range of pressures, i.e. from atmospheric pressures to pressures of $10^{-2}$ to $10^{-3}$ Torr.

According to the conventional method which uses the fork oscillator to measure such pressures, the fork oscillator is placed in the space of a particular gaseous substance whose pressure is to be measured thereby, and an oscillator circuit is used to cause the fork oscillator to produce oscillations. Then, the pressures in the gaseous substance may be determined from the difference $\Delta Z \, (=Z-Z_0)$ between the resonance resistance $Z$ at that time and the natural resonance resistance $Z_0$ of the fork oscillator (the value in high vacuum).

In the conventional method that uses the fork oscillator to measure pressures, as described above, the fork oscillator usually has a temperature that is indefinitely varying during the measuring process, which may cause large errors when measuring the pressures in the lower pressure range. This would inadvantageously make accurate pressure measurement impossible.

The natural resonance resistance $Z_0$ as described above remains stable in a wide temperature range ($-20°$ C. to $+60°$ C.), such that it only changes by a factor of several K ohms ($\Omega$) in that temperature range, while the value of the resistance difference $\Delta Z$ is decreasing by the order of several K ohms in the pressure range between $10^{-1}$ and $10^{-2}$ Torr, and is decreasing by the order of several tens of ohms in the pressure range between $10^{-2}$ and $10^{-3}$ Torr, which means that the value of $\Delta Z$ is decreasing as the pressures are reduced. The change in the natural resonance resistance $Z_0$ that is caused by any changes in the temperature of the fork oscillator cannot be neglected. This therefore imposes limitations on the ability of the fork oscillator to measure the pressures.

In order to prevent the natural resonance resistance $Z_0$ of the fork oscillator from being affected by any changes in its temperature, a pressure measuring probe, as shown in FIG. 6, is used which includes a fork oscillator 41 buried in an aluminum block 42, and a heater 43 and a temperature sensor 44 also buried in the same aluminum block 42 to maintain the fork oscillator 41 at a constant temperature.

For such a pressure measuring probe, however, the aluminum block 42 has an inherent thermal capacity that causes a time lag or delay to occur before the fork oscillator 41 is controlled to reach the specific temperature at which it should be maintained. Specifically, one problem of the device is the slow response time when the probe is measuring pressures, and another problem is that the measuring circuit must include an additional temperature control circuit for the heater 43 and temperature sensor 44, which makes the measuring circuit more complicated and expensive.

SUMMARY OF THE INVENTION

In light of the above problems, the present invention proposes to provide a method whereby a pressure can be measured with high precision using a fork oscillator without the need of providing the extra components of the prior art.

In order to achieve the above object, a pressure measuring method using a fork oscillator according to the present invention includes determining a pressure in a gaseous substance from a difference $\Delta Z$ between a natural resonance resistance $Z_T$ of the fork oscillator at a determined temperature and its actual resonance resistance $Z$ as measured, wherein the method is characterized by the additional steps of measuring a resonance frequency "f" for the fork oscillator, determining a temperature $T$ of the fork oscillator from the measured frequency "f", and determining the natural resonance resistance $Z_T$ at the determined temperature $T$.

As a general rule, the resonance resistance $Z$ may be determined by driving the fork oscillator at a stabilized AC voltage that is applied across it, and then obtaining the resonance current at that time and performing an arithmetic operation. The natural resonance resistance $Z_T$ at the temperature $T$ may be measured by setting a voltage equal to a value $Z_c$ denoting the natural resonance resistance $Z_T$ at a constant temperature (20° C., for example) as reference voltage, obtaining a voltage equal to a difference $\Delta Z_T$ between $Z_T$ and $Z_c$ at the temperature $T$ from the resonance frequency "f", and enabling an operational amplifier to perform an arithmetic operation on the two input voltages. The output of the operational amplifier determines the natural resonance resistance $Z_T$ at the temperature $T$. In the process described above, the temperature $T$ is determined substantially from the resonance frequency "f", and the temperature $T$ is then used for determining the difference $\Delta Z_T$.

The values of $Z_T$, $Z_c$, and $\Delta Z_T$ which are used herein are defined below.

$Z_T$ is defined as the natural resonance resistance for the fork oscillator at a temperature $T$ and the value that represents the natural resonance resistance. This value may vary according to changes in temperature.

$Z_c$ is defined as the natural resonance resistance $Z_T$ at a constant temperature (20° C., for example) and the value that represents this resonance resistance. This value may be derived from $Z_c + \Delta Z_T$.

$\Delta Z_T$ is defined as the difference between $Z_T$ and $Z_c$ at a given temperature.

According to the pressure measuring method of the present invention, the difference $\Delta Z$ may be determined from the natural resonance resistance $Z_T$ of the fork oscillator and the actual resonance resistance $Z$ the measured pressure, even if there are changes in the temperature of the fork oscillator during the measuring process. Thus, the pressure may always be measured with high precision without any errors.

BRIEF DESCRIPTION OF THE DRAWINGS

Those and other objects, features, and merits of the present invention will become more apparent from the detailed description of the preferred embodiments of the invention that follows with reference to accompanying drawings, in which.

DESCRIPTION OF THE PREFERRED EMBODIMENTS

Figure 1:
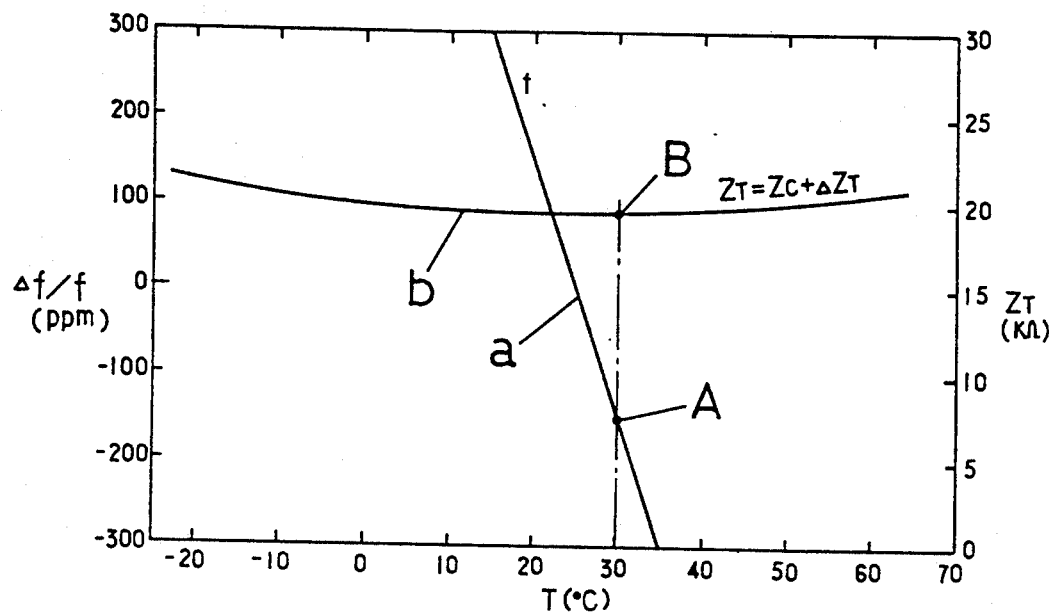
FIG. 1 is a graphical representation that illustrates characteristics curves showing the relationships between the varying temperature of the fork oscillator used in the embodiments of the present invention and the respective corresponding changes in the resonance frequency and natural resonance resistance.

The present invention is now described in greater detail by referring to several preferred embodiments thereof shown in the drawings.

Figure 2:
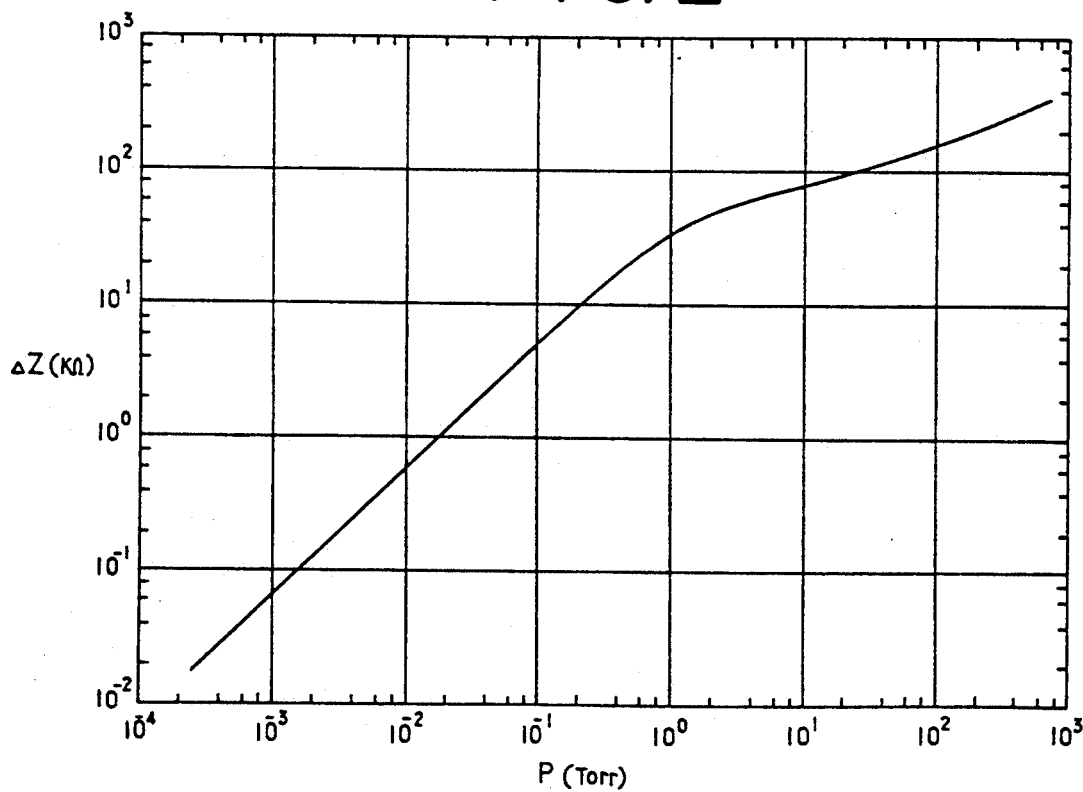
FIG. 2 is a graphical representation that illustrates a characteristics curve showing the pressure difference for the fork oscillator.

A tuning fork crystal oscillator (which is referred to as a "fork oscillator") that may be used for purposes of the present invention has linear operational characteristics, as identified by the line "a", in FIG. 1 showing the relationship between temperature T and the resonance frequency f. The fork oscillator also has curved operational characteristics, as identified by line "b" in FIG. 1, showing the relationship between the temperature T and the natural resonance resistance $Z_T$. This fork oscillator also has the operating characteristics shown in FIG. 2, depicting the relationship between the pressure P in a particular gaseous substance (air) and the resonance resistance difference $\Delta Z$ $(=Z-Z_T)$.

Figure 3:
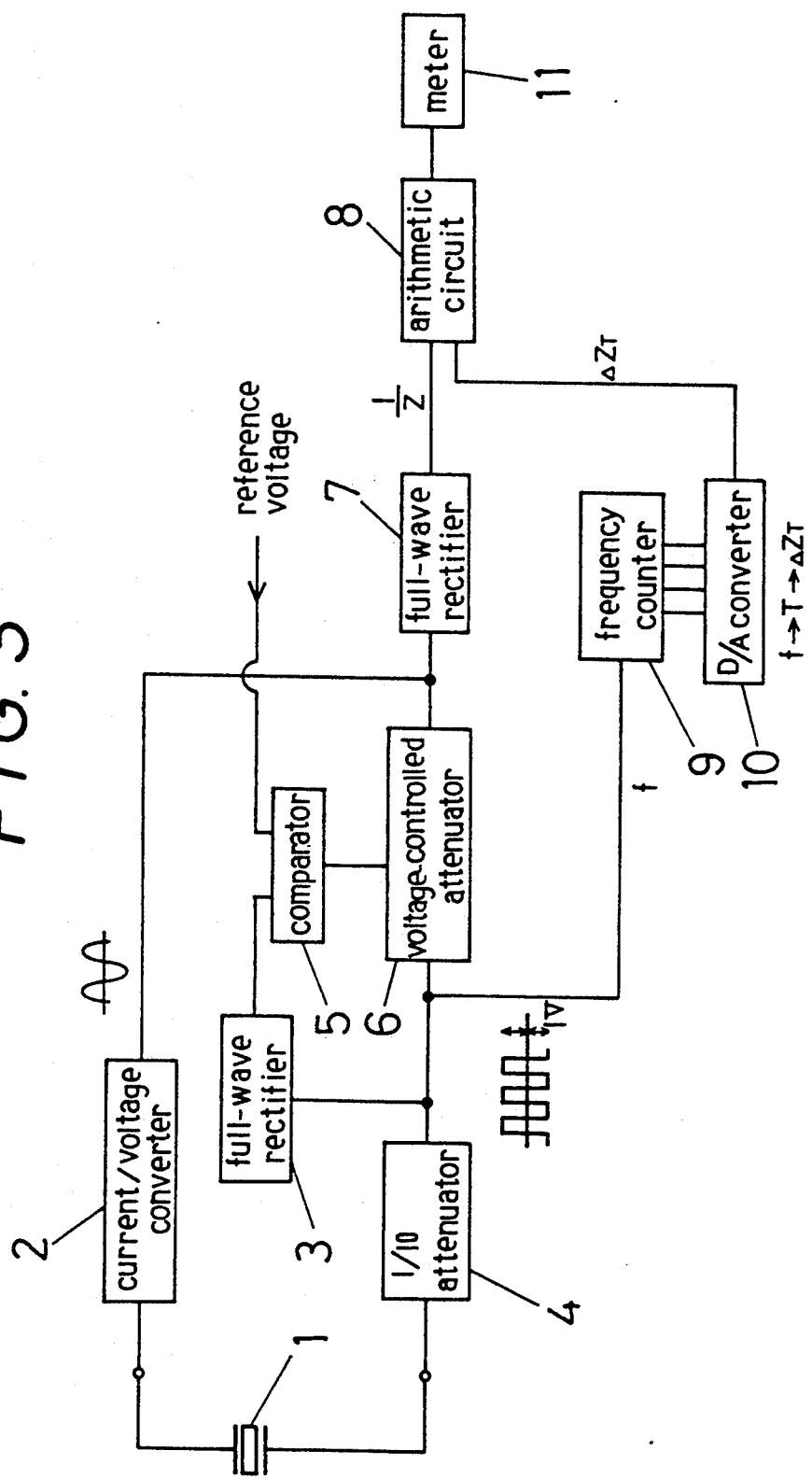
FIG. 3 is a block diagram of a measuring circuit according to one embodiment of the present invention.

A fork oscillator 1 having the operating characteristics described above may be used to constitute a pressure measuring circuit, as shown in FIG. 3. Referring to FIG. 3, the measuring circuit includes a current/voltage converter 2, a full-wave rectifier 3, a 1/10 attenuator 4, a comparator 5, a voltage-controlled attenuator 6, a full-wave rectifier 7, an arithmetic circuit 8, a frequency counter 9, a digital to analog (D/A) converter 10, and a meter 11.

The full-wave rectifier 3, 1/10 attenuator 4, comparator 5 and voltage-controlled attenuator 6 form a stabilized AC voltage supply, and the stabilized AC voltage supply and the fork oscillator 1 form a self-excited oscillator.

In the measuring circuit that has the arrangement as described above, a signal that corresponds to a resonance current in the oscillator circuit is applied through the current/voltage converter 2 and full-wave rectifier 7 to one of the inputs of the arithmetic circuit 8. As the signal that corresponds to the resonance current is also the signal that corresponds to the resonance resistance Z, the signal that is applied to the one input of the arithmetic circuit 8 effectively represents the signal 1/Z related to the resonance resistance Z. A signal representing $\Delta Z_T$ is applied to the other input of the arithmetic circuit 8 from the frequency counter 9 and D/A converter 10.

Figure 4:
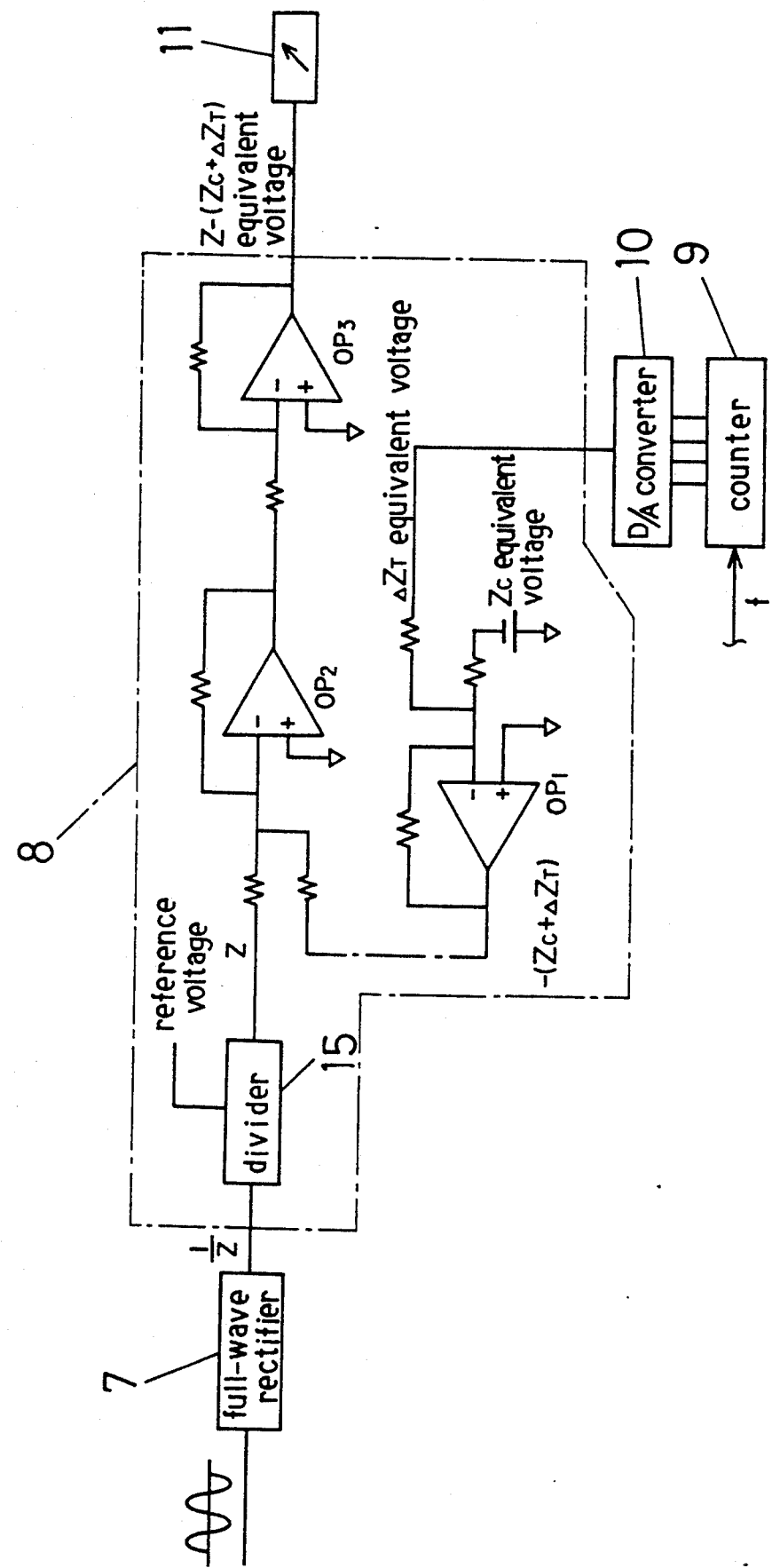
FIG. 4 is a circuit diagram for an arithmetic circuit in the embodiment of FIG. 3.
Figure 6:
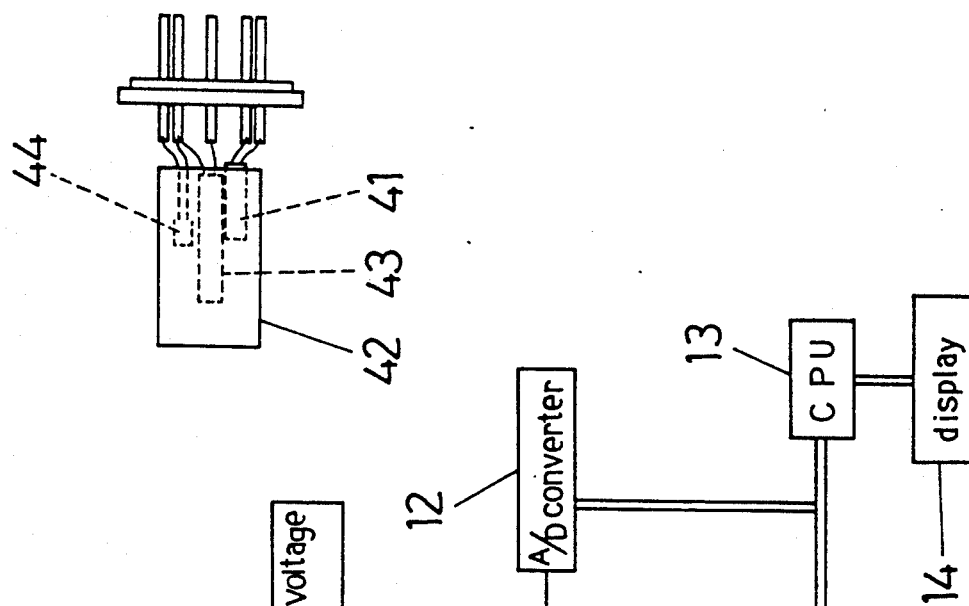
FIG. 6 is a front view of a conventional fork oscillator temperature control apparatus.

The arithmetic circuit 8 has an arrangement as shown in FIG. 4, including operational amplifiers $OP_1$ to $OP_3$ and a divider 15.

The frequency counter 9 and D/A converter 10 respond to the input resonance frequency "f" to operate according to the characteristics curves shown in FIG. 1, and provides the resistance value $\Delta Z_T$ that represents the temperature of the fork oscillator.

The operational amplifier $OP_1$ responds to the input signal $\Delta Z_T$ from the frequency counter and D/A converter and the input reference voltage $Z_c$, and an provides output of $-(Z_c+\Delta Z_T)$. Then, the output of $-(Z_c+\Delta Z_T)$, that is, the negative value of $Z_T$ and the value of the resonance resistance Z from the full-wave rectifier 7 are added together, the result of $Z-Z_T$ is fed to operational amplifier $OP_1$ whose output is then fed to OP2, whose output $\Delta Z$ may be used to drive the meter 11 according to FIG. 2.

In the arrangement as described above, it may be appreciated that point A in FIG. A is determined substantially from the resonance frequency "f", then point B is determined. Thus, the natural resonance resistance $Z_T$ of the fork oscillator 1 can be represented any temperature that occurs during the measuring process, rather than using the fixed value $Z_O$ in the high vacuum according to the prior art method. Any errors that may be caused by any changes in the temperature of the fork oscillator 1 can be eliminated.

Figure 5:
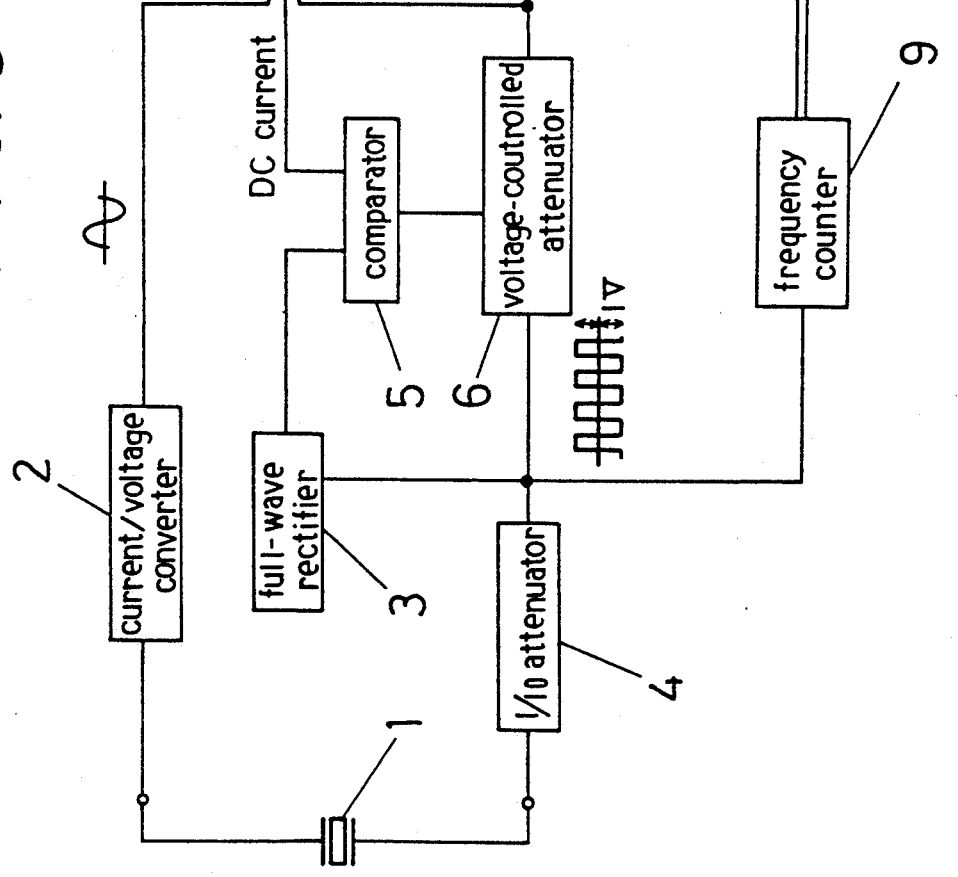
FIG. 5 is a block diagram of a measuring circuit according to another embodiment of the present invention.

Referring next to FIG. 5, another embodiment of the measuring circuit is shown. This measuring circuit provides a digital display, in contrast to the preceding embodiment that provides an analog display. In FIG. 5, similar elements are given the same reference numerals as those in the preceding embodiment. This embodiment differs from the preceding embodiment in that the resonance resistance 1/Z from the full-wave rectifier 7 is applied to A/D converter 12 which provides the corresponding digital output. This digital output is applied to CPU 13 together with the output from the frequency counter 9, and CPU 13 performs the arithmetic operations thereon. The output of CPU 13 may be presented in digital form on a display 14. The CPU 13 may perform the same operations as described in the previous embodiment, and may contain a memory for storing programs and the data as shown in FIG. 1.

Like the preceding embodiment, the current embodiment can determine the pressures from the natural resonance resistance $Z_T$ at the temperature of the fork oscillator during the measuring process, and can also eliminate any errors that may be caused by any changes in the temperature.

As it may be understood from the foregoing description, the method according to the present invention allows any changes in the temperature of the fork oscillator to be detected, and a pressure difference $\Delta Z$ to be determined from the natural resonance resistance $Z_T$ at that temperature and the measured resonance resistance Z corresponding to the pressure, thereby determining the pressures. Thus, any errors that may be caused by any changes in the temperature of the fork oscillator during the measuring process can be eliminated, and the pressures can be measured with high precision. As there are no errors due to changes in the temperature, the possible measuring range can be extended to lower pressure ranges, thus covering a broader pressure range overall.

Although the present invention has been described with reference to the several preferred embodiments thereof, it should be understood that various changes and modifications may be made without departing from the spirit and scope of the invention as defined in the appended claims.

What is claimed:

1. A method of measuring pressure using a tuning fork oscillator, comprising:
    a step of measuring a resonance frequency of said tuning fork oscillator subjected to said pressure to be measured;
    a step of determining a natural resonance resistance of said tuning fork oscillator from the resonance frequency of said tuning fork oscillator based on a first predetermined relation between said resonance frequency of said tuning fork oscillator and said natural resonance resistance of said tuning fork oscillator;
    a step of measuring an actual resonance resistance of said tuning fork oscillator subjected to said pressure to be measured;
    a step of determining a difference between said actual resonance resistance and said natural resonance resistance of said tuning fork oscillator; and,
    a step of determining said pressure from said difference based on a second predetermined relation between said difference and said pressure.

2. A method as recited in claim 1, wherein said step of measuring said actual resonance resistance includes driving said tuning fork oscillator in a resonance state by applying an AC voltage thereto, measuring a resultant resonance current of said tuning fork oscillator, and determining said actual resonance resistance from said AC voltage and said resonance current.

3. A method as recited in claim 2, wherein said step of determining said natural resonance resistance includes setting in advance a first voltage having a value denoting said natural resonance resistance at a predetermined temperature of said tuning fork oscillator, generating based on said resonance frequency a second voltage having a value denoting a difference between said natural resonance resistance at said predetermined temperature and said natural resonance resistance at a temperature of said tuning fork oscillator while subjected to said pressure, and summing said first and second voltages to obtain a third voltage denoting said natural resonance resistance at said temperature of said tuning fork oscillator while subjected to said pressure.

4. A method as recited in claim 1, wherein said step of determining said natural resonance resistance includes setting in advance a first voltage having a value denoting said natural resonance resistance at a predetermined temperature of said tuning fork oscillator, generating based on said resonance frequency a second voltage having a value denoting a difference between said natural resonance resistance at said predetermined temperature and said natural resonance resistance at a temperature of said tuning fork oscillator while subjected to said pressure, and summing said first and second voltages to obtain a third voltage denoting said natural resonance resistance at said temperature of said tuning fork oscillator while subjected to said pressure.

5. In a method of measuring pressure by obtaining a difference between an actual resonance resistance of a tuning fork oscillator subjected to said pressure and a natural resonance resistance of said tuning fork oscillator, and then applying said difference to a first predetermined relation to obtain a measurement of said pressure, the improvement comprising compensating for variations in said natural resonance resistance of said tuning fork oscillator due to temperature variations of said tuning fork oscillator by measuring a resonance frequency of said tuning fork oscillator and then determining said natural resonance of said resistance of said tuning fork oscillator from said resonance frequency based on a second predetermined relation between said resonance frequency and said natural resonance resistance of said tuning fork oscillator, wherein said resonance frequency of said tuning fork oscillator is indicative of said temperature of said tuning fork oscillator.

* * * * *